United States Patent
Cerdan (10) Patent No.: US 9,308,485 B2
(45) Date of Patent: Apr. 12, 2016

(54) SYSTEM AND METHOD FOR FILTERING INLET AIR IN AN AIR CONDITIONER AIR HANDLER

(75) Inventor: Nivaldo Cerdan, Hollywood, FL (US)

(73) Assignee: A/C INNOVATIONS, LLC, Davie, FL (US)

( * ) Notice: Subject to any disclaimer, the term of this patent is extended or adjusted under 35 U.S.C. 154(b) by 562 days.

(21) Appl. No.: 13/221,522

(22) Filed: Aug. 30, 2011

(65) Prior Publication Data

US 2013/0047642 A1 Feb. 28, 2013

(51) Int. Cl.
*B01D 47/02* (2006.01)
*F24F 3/16* (2006.01)

(52) U.S. Cl.
CPC ............ *B01D 47/027* (2013.01); *F24F 3/1603* (2013.01); *B01D 2247/105* (2013.01); *F24F 2003/1617* (2013.01)

(58) Field of Classification Search
CPC  F24F 3/1607; F24F 3/1603; F24F 2003/1617
USPC ........... 62/90, 283, 291, 426.1; 454/187, 184, 454/254, 338, 237
See application file for complete search history.

(56) References Cited

U.S. PATENT DOCUMENTS

| | | | | |
|---|---|---|---|---|
| 3,988,900 A | * | 11/1976 | Kamata ..................... | F24F 1/00 454/236 |
| 4,771,611 A | * | 9/1988 | McNab ................... | F24F 3/147 62/311 |
| 5,460,569 A | * | 10/1995 | Josefsson ............ | B05B 15/1222 454/52 |
| 5,589,132 A | * | 12/1996 | Zippel ....................... | F24F 3/12 250/436 |
| 5,873,930 A | * | 2/1999 | Sanchez .................. | A47L 9/181 55/445 |
| 2009/0133424 A1 | * | 5/2009 | Wiggs ............................. | 62/260 |
| 2009/0293527 A1 | * | 12/2009 | Rakuma .................... | A61L 9/00 62/317 |

\* cited by examiner

*Primary Examiner* — Mohammad M Ali
*Assistant Examiner* — Meraj A Shaikh
(74) *Attorney, Agent, or Firm* — Johnson & Martin, P.A.; James David Johnson (57) ABSTRACT

A system for filtering inlet air of an air conditioner air handler, and method of filtering inlet air without a conventional filter, said system is a structure comprising: an air inlet, an air directing structure, a water chamber, positioned within an internal cavity, a structure for directing condensate from an air handler into said water chamber, a drain positioned to impart a maximum water level of water accumulated in said first water chamber; a second air directing structure configured to direct air from said first internal cavity towards an outlet that is affixed to the inlet of an air conditioner air handler.

20 Claims, 5 Drawing Sheets

FIG.4
SECTION OF FIG.1

FIG.5

SYSTEM AND METHOD FOR FILTERING INLET AIR IN AN AIR CONDITIONER AIR HANDLER

BACKGROUND OF THE INVENTION

Air conditioner air handlers require regular care and maintenance. One are of care involves the continual changing of an inlet air filter. Filters are changed typically every one to six months. However, many persons fail to change their filters and there is often damage to the air handler.

A system and method is contemplated where an air handler n loner requires a filter.

BRIEF SUMMARY OF THE INVENTION

In one embodiment, the present invention is a system for filtering inlet air of an air conditioner air handler, said system is a structure comprising:
an air inlet;
an first air directing structure configured to act in concert with said air inlet to direct air from said air inlet into a first internal cavity;
a first water chamber, said water chamber positioned within said first internal cavity such that inlet air passing through said air directing structure directs air above a water level of said first water chamber;
a structure for directing condensate from an air handler into said water chamber;
a drain positioned to impart a maximum water level of water accumulated from said condensate in said first water chamber;
a second air directing structure configured to direct air from said first internal cavity towards an outlet that is affixed to the inlet of an air conditioner air handler.

The system has an air inlet configured to draw in ambient air through a negative pressure differential formed from an inlet fan of an air conditioner air handler.

The system has an air constricting structure incorporated within said first air directing structure.

The system also has a second water chamber positioned above the first water chamber.

The second water chamber is positioned in an airflow stream between the first water chamber and the system outlet where air exits the system and enter the air handler.

Also contemplated is a method of removing particulate from an air conditioner air handler inlet comprising:
providing a structure of claim 1;
arranging said structure to connect said structure outlet to an air conditioner air handler inlet in order that said arranging is accomplished with substantially all air exiting the structure entering the air handler;
activating said air conditioner air handler, said activating imparting negative pressure in said structure an drawing ambient air into said inlet;
directing said ambient air through said first internal cavity and across an upper surface of water in said first water chamber;
further directing said ambient air from said first internal cavity to said second air directing structure configured to direct air from said first internal cavity towards an outlet that is affixed to the inlet of an air conditioner air handler;
said method removing particulate from said ambient air before said ambient air is directed to said outlet, removal of particulate having efficiency substantially similar to air filtered by a conventional air conditioner air handler filter

DETAILED DESCRIPTION OF THE PREFERRED EMBODIMENT

The present invention includes an assembly 10 that is utilized with existing air conditioner air handlers. The system has a configuration that interacts with the components of an air conditioner air handler. Ambient air 70 is drawn into system 10 through a cavity formed by front frame 14 and lower vertical baffle plate 36. As air is drawn in, it is directed into air constriction area 74 by virtue of air constriction deflector 72. Ambient air is forced into inlet cavity 96 and contacts water 92 positioned in lower water chamber 76. Air continues to flow within the interior portion of lower vertical baffle plate 36 into cavity 97 and over upper water chamber 78 contacting water 94 located in upper water chamber 78. Air flows along first deflecting baffle 34 into cavity 98 and second deflecting middle baffle plate 32 below cavity 99. Upper baffle plate 30 directs air into upper chamber 84 defined by upper wall 28. Airflow continues from the apparatus into the air conditioning air handler as indicated in airflow direction by arrow in FIG. 5. Water positioned in each of lower water chamber 76 and upper water chamber 78 is supplied to the apparatus utilizing condensate water 84 created by the air conditioner air handler and fed by pipe 42 to upper water chamber 78. Upper water chamber 78 fills until exceeding upper water chamber water level 82. Once water exceeds upper chamber water level 82, water travels gravitationally to lower water chamber 76. As water exceeds lower chamber water level 80, water drains through waist water drain 90 and is further directed from the system through drain connector 44 that directs water outward through waist water pipe 54. As previously stated, water travels into the apparatus as is normally collected in an air conditioner air handler condensate.

Figure 1:
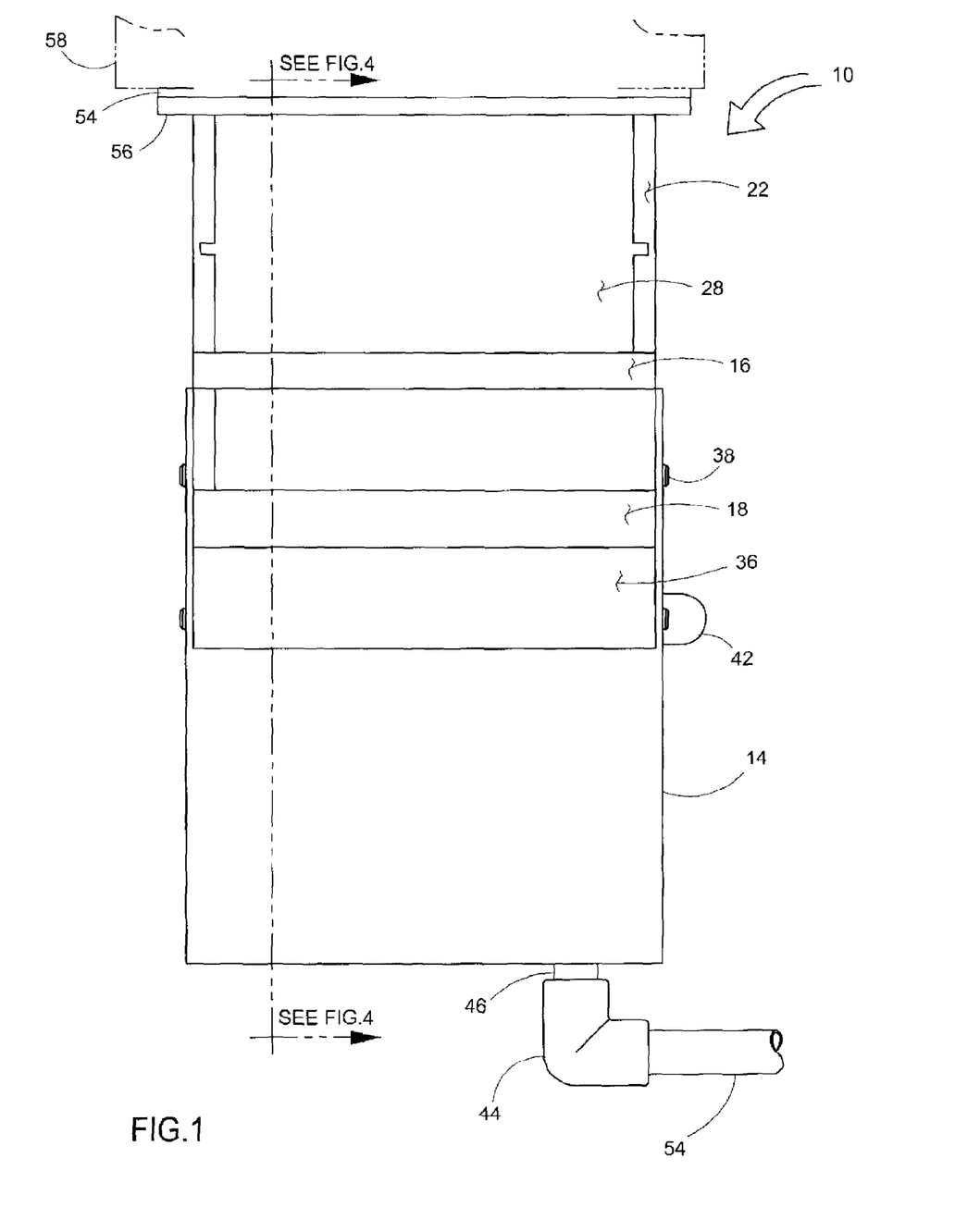
FIG. 1: A front view of the present invention.
Figure 2:
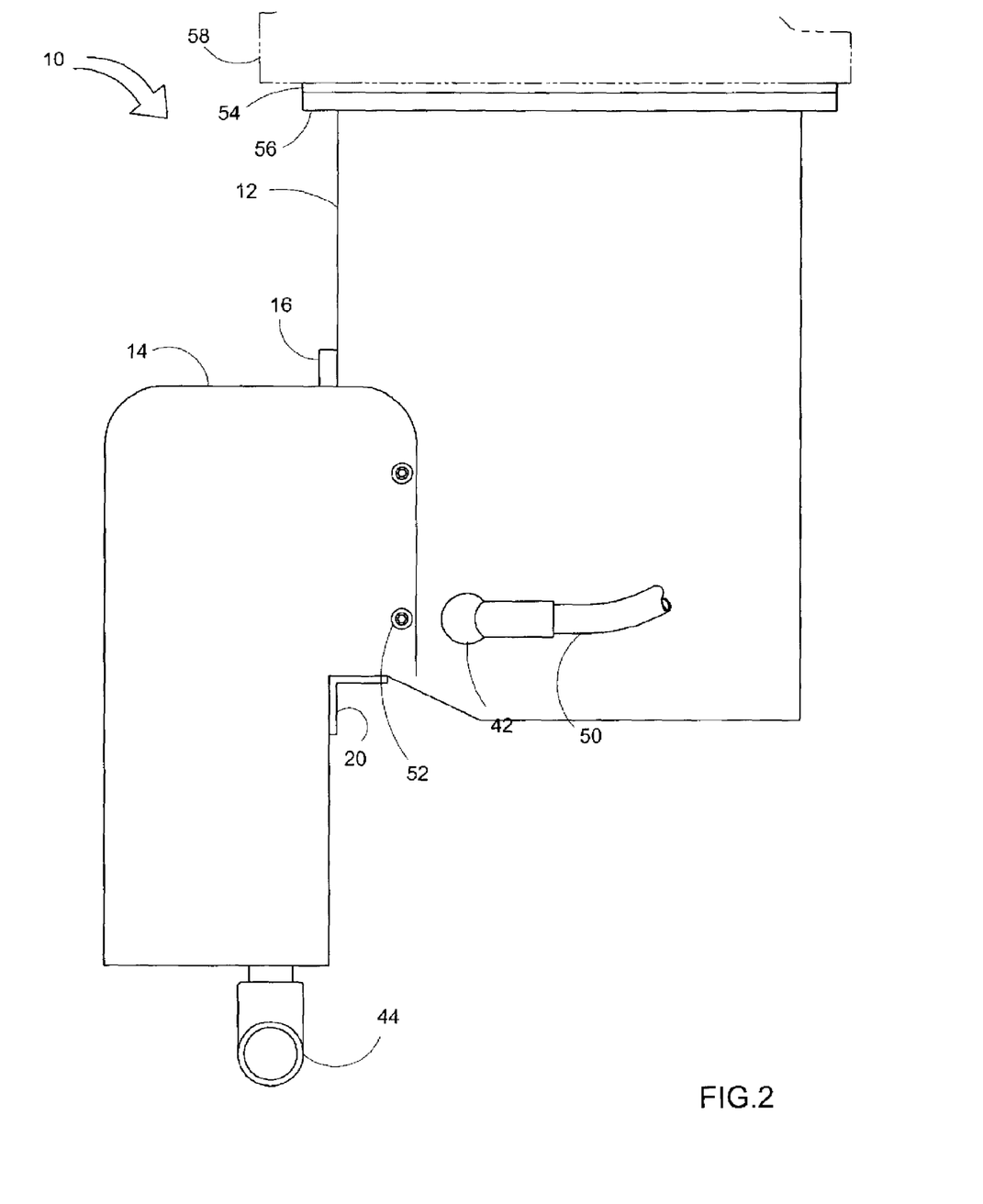
FIG. 2: A right side view of the present invention.
Figure 3:
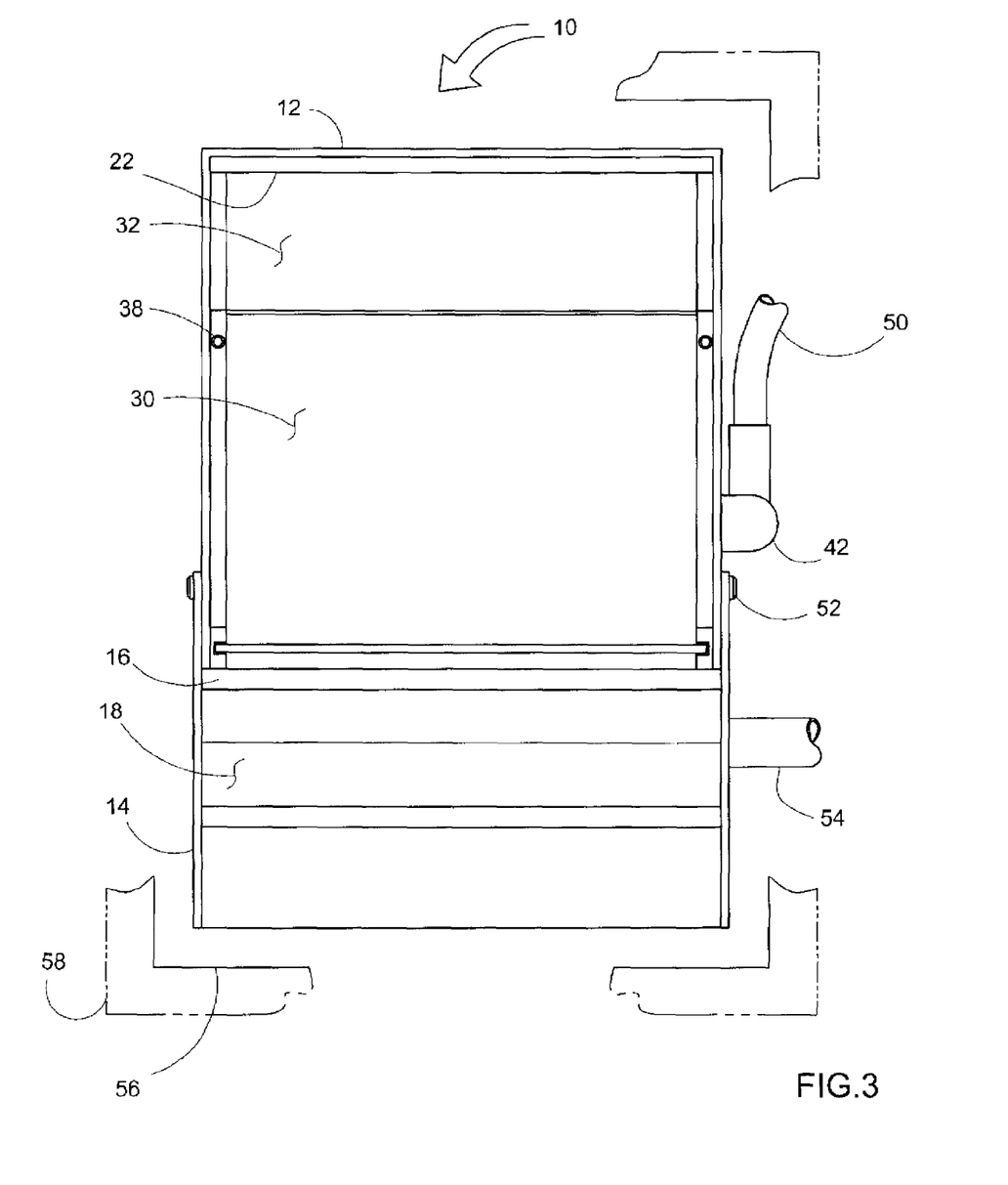
FIG. 3: An opened front view of the present invention.
Figure 4:
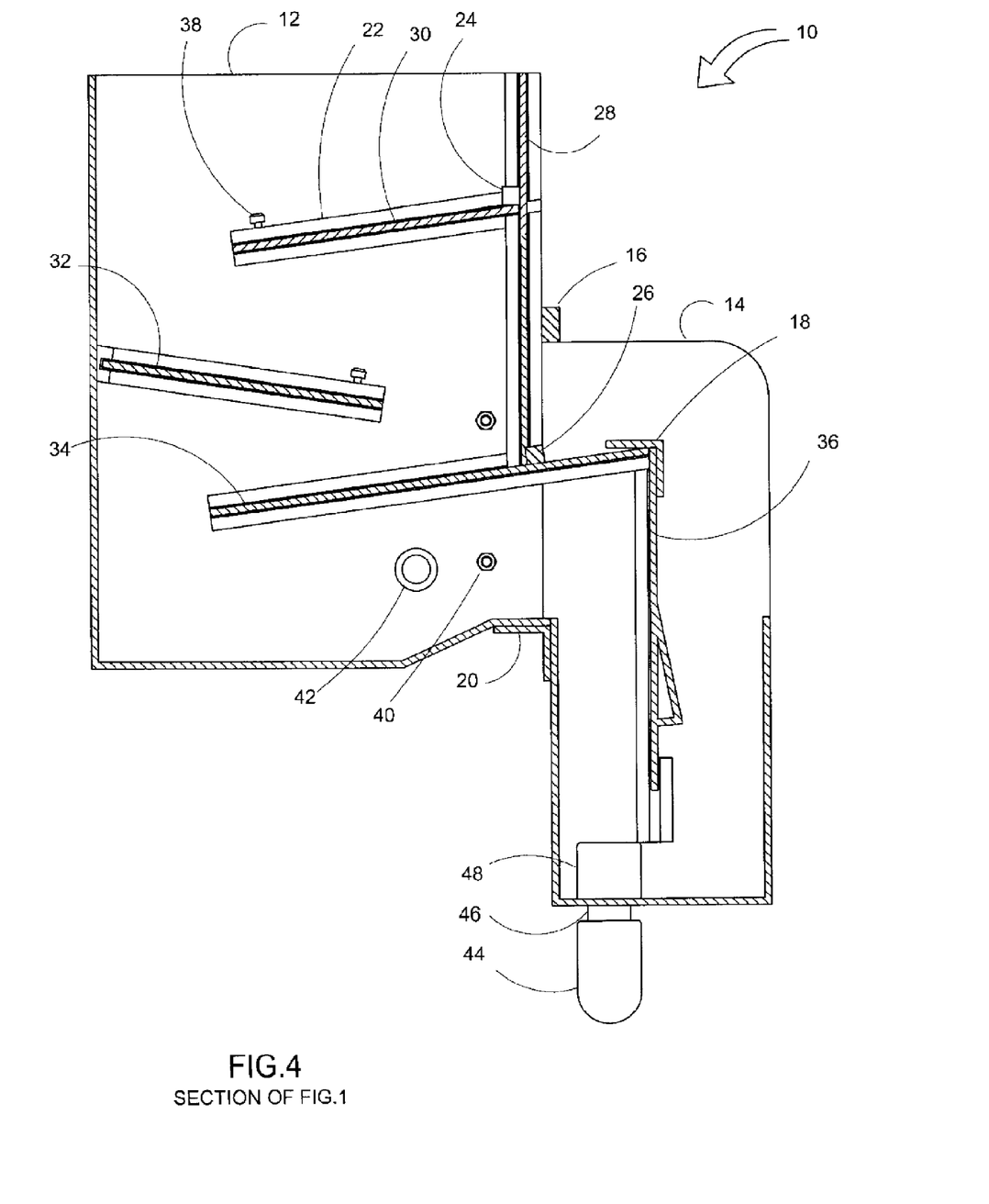
FIG. 4: A cross section side view of the present invention.
Figure 5:
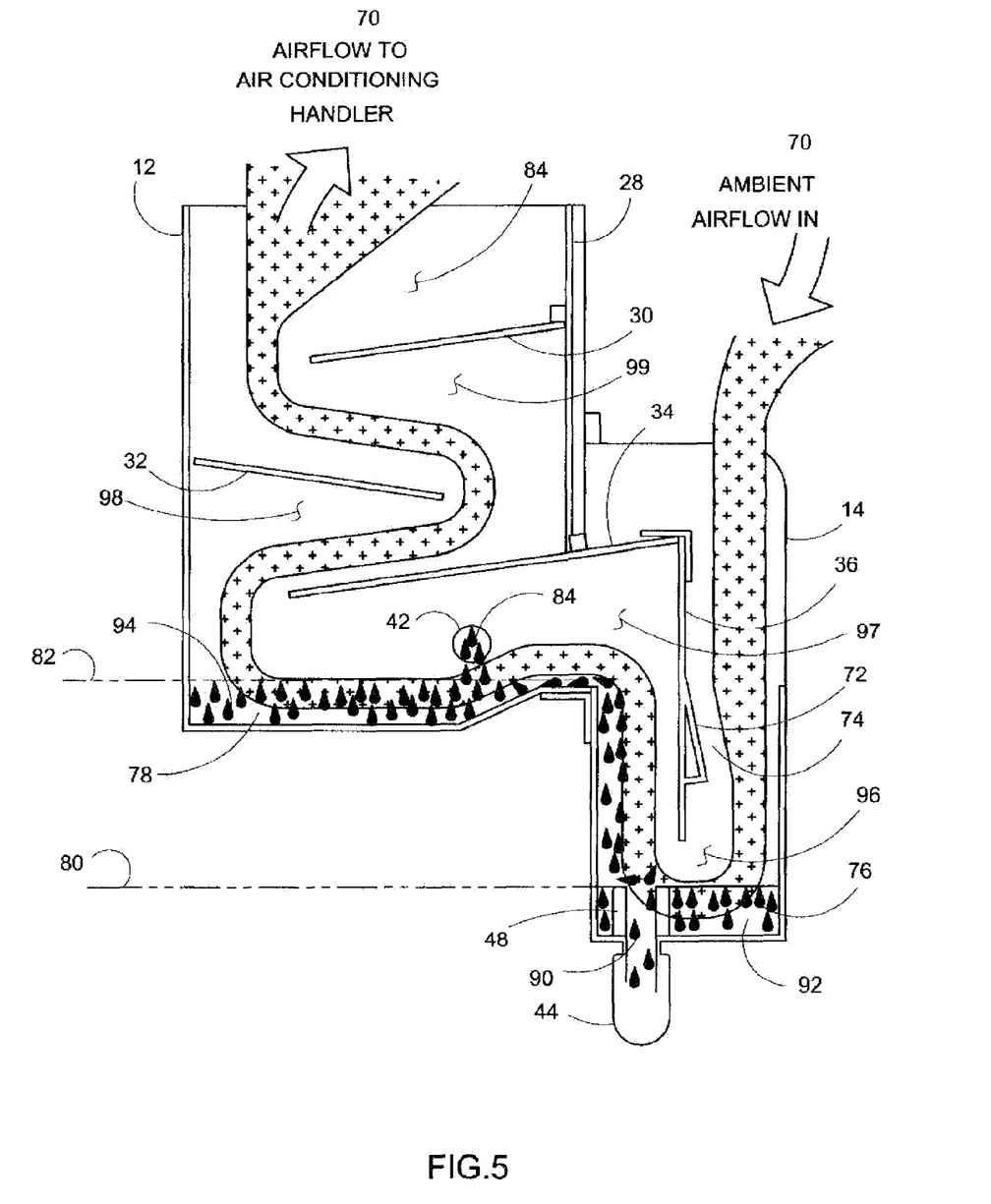
FIG. 5: A cross section side diagram showing air and water flow.

Article 10 is constructed and arranged to be positioned next to and work with an existing air conditioner air handler. Air handler 58 interfaces with article 10 at gasket 54 which seals the opening and prevents air passing through article 10 from escaping. All air is directed into the air handler. A filter bracket 56 is used to position article 10. Article 10 obviates the need for air handler filters. Support rails 22 support upper perimeter walls 28. A cross brace 16 further provides support to article 10. Inlet hose 50 collects condensate from the air handler and directs collected condensate water 84 into article 10 through inlet tube 42. A lower brace 20 supports the inlet assembly which is formed of inlet frame 14. Ambient air 70 flows into article 10 through an opening as best seen in FIG. 5.

An additional feature in the present invention provides for indication of malfunction the system cease to function properly.

In an embodiment where the lower water chamber 76 fails to drain properly, water 92 rises to a level at or above constrictor 72. Ambient air 70 is prevented from traveling thorough the intended air route in article 10. In such situations, the air handler will freeze due to a lack of inlet air. When the air handler freezes, the air conditioner will cease cooling and an operator will inspect the cause of the malfunction.

This particular system provides for a method of removing impurities such as dirt, dust, allergens and the like from entering a typical air conditioner and air handling system. The system and method of the present invention provides efficiency equal to or greater than conventional fiber filters. As air enters the system, heavier particles such as dust, dirt and allergens contact water in several different locations. These particles when in contact with water will remain in the water and be drawn out of the air flowing through the system. As the water levels accumulate, they eventually collect in the lower most water chamber, which is lower water chamber 76. As the water level in lower water chamber 76 exceeds in lower water chamber 80, water is drained through coupling 48 and water drain 90 eventually to be removed from the system. As will be noted from test results below, the system is shown to greatly reduce dirt, dust and allergens from air transported there through.

The present invention further relates to a method for removing particulate from inlet air traveling into the inlet of an air conditioning air handler.

Typically, filters are utilized for the removal of particulates from air inlet.

The filters need to be changed and have significantly variable levels of efficiency.

A test was performed an air handler with a standard filter against an air handler without a filter in which the apparatus is utilized.

Both tests were performed using Surface Microscopy analysis with an Allergen Screen Check kit.

The test results appear below:

Test 1
Air Handler with Conventional Filter.
Particle Identification Opaque Particles Skin Cell Fragments Insect Biodetritus Total Fibers
Manmade Fibers
Total Pollen
Total Fungal Elements/Spores *Curvularia* species
Total "Other" "Talc-Like" Particles Reddish-Brown Particles Black Particles
Method of Analysis: EDLAB SOP 7/13001

The results in this report apply only to the sample(s) specifically listed above and tested at Environmental Diagnostics Laboratory. Unless otherwise noted, samples were received in good condition. Laboratory prepared Quality Control (OC) samples are analyzed with the samples routinely; however, unless a blank (control) is received, the result for the control is not compared. Quantitative data is based on 3 significant figures; Grand Total may not equal 100% due to rounding.

Opaque Particles Identified from Tape Prep Assays
Opaque Particles
These particles may originate from inorganic or organic sources in nature. However, it appears opaque when observed under light microscopy. It has various shape and sizes. It may be regular or irregular in shape. On an average it can be measured less than one micron to well over fifty microns with some exceptions. Commonly these particles include but are not limited to dust & debris, paint, combustions, emission, ash, silica and others.

These particulates are significant from a health/allergy point of view especially in case of respiratory disorder.

Fibers Identified from Tape Prep Assays
Man-made fibers may come from natural raw materials like cellulose or from synthetic chemicals like rayon, nylon, etc. In indoor environments, some important sources of man made fiber include carpet. cellulose based building materials, clothing, paper and paper products, etc. Size of these fibers varies from a few microns to a few millimeters; however, an average size range may be 1 micron to over 500 microns. Health implications of these particles are not well described. however some of the manmade fibers are important from an allergy point of view especially for dermal allergy.

Spores I Fungal Elements Identified from Tape Prep Assays
*Curvularia* Species
*Curvularia* species are found worldwide and are very common. The hyphae, conidiophores, and conidia are pigmented olivaceous-brown (dematiaceous). They can be isolated from the air, plants (especially grasses), sand dune soil, and soil. Rarely, they can be an opportunist human pathogen causing allergic reactions, eye (corneal) infections, mycetoma, and infections in immunocompromised patients.

Other Material Identified from Tape Prep Assays
"Talc-Like" Particles
These are thin disk-like particles of variable size range (10 to 50 micron), It may be organic or inorganic in nature. In indoor environment these particles mainly come from cornmeal, other grain flour, talcum powder etc. Some of these particles may adversely influence the health of dweller (example talcum powder).

Black Particles
These microscopic particles may originate from an organic source material. They greatly vary in their shape and sizes depending on their origin. However, an average size ranges between 1-micron to 5 micron with some exceptions. It may be regular or irregular in shape. In the indoor environment some important source/cause of these particles includes but are not limited to combustion, burning of oil & candles, chimney shoot, automobile exhaust, neoprene (rubber compound that applied to the inside surface of fiber glass duct liner), and other organic materials emitted by copier machines, printers, abraded paints etc. These particles may influence health and hygienic condition of dwellers.

Reddish-Brown Particles
These microscopic particles may originate from inorganic or organic source materials. In indoor environments these particles mainly come by rusting, coarse, weathering of materials etc. They may also be released into the environment due to deterioration of wood or wood products, art and sculpture work etc. These particles greatly vary in their shape and sizes. It can be measured from a few micron to over 100-microns. This particle may be the indicator of moisture problem in indoor environment.

The health implications of this material are not well established however; it may be significant from a health and hygiene point of view.

TABLE 1

| Particle Identification | Raw Count | Total Count (Cts/cm$^2$) | Percent of Total Count |
|---|---|---|---|
| OpaqueParticles | 127 | 6,350 | 92.4% |
| Skin Cell Fragments | 49 | 196 | 2.85% |
| Insect Biodetritus | BDL | BDL | N/A |
| Total Fibers | 18 | 72 | 1.05% |
| Manmade Fibers | 18 | 72 | 1.05% |
| Total Pollen | BDL | BDL | N/A |
| Total Fungal Elements/Spores | 2 | 8 | 0.116% |
| Dematiaceous Fungal Hyphal Elements | 1 | 4 | 0.0582% |
| Dematiaceous Fungal Spore Elements | 1 | 4 | 0.0582% |

TABLE 1-continued

| Particle Identification | Raw Count | Total Count (Cts/cm²) | Percent of Total Count |
|---|---|---|---|
| Total "Other" | 62 | 248 | 3.61% |
| Reddish-Brown Particles | 17 | 68 | 0.99% |
| Black Particles | 45 | 180 | 2.82% |
| Total Counts: | 258 | 6,870 | 99.9% |

BDL = Below Detection Limit: No particles were reported from the microscopically observed area on the specimen slide (at 10 x 10 or 10 x 40 magnification).

Table 1 and FIGS. 6 and 7 show significant particulate detected in the inlet air.

Test 2

The experiment was repeated utilizing the system of the present invention in an air handler with no filter in place.

TABLE 2

| Particle Identification | Raw Count | Total Count (Cts/cm²) | Percent of Total Count |
|---|---|---|---|
| OpaqueParticles | 221 | 884 | 90.9% |
| Skin Cell Fragments | 4 | 16 | 1.65% |
| Insect Biodetritus | BDL | BDL | N/A |
| Total Fibers | 1 | 4 | 0.412% |
| Manmade Fibers | 1 | 4 | 0.412% |
| Total Pollen | BDL | BDL | N/A |
| Total Fungal Elements/Spores | 1 | 4 | 0.412% |
| Curvularia species | 1 | 4 | 0.412% |
| Total "Other" | 16 | 64 | 6.58% |
| "Talc-Like" Particles | 2 | 8 | 0.82% |
| Reddish-Brown Particles | 3 | 12 | 1.23% |
| Black Particles | 11 | 44 | 4.53% |
| Total Counts: | 243 | 972 | 100% |

BDL = Below Detection Limit: No particles were reported from the microscopically observed area on the specimen slide (at 10 x 10 or 10 x 40 magnification).

Surface Microscopy (Tape Prep Assays)
Opaque Particles Identified from Tape Prep Assays
Opaque Particles These particles may originate from inorganic or organic sources in nature. However, it appears opaque when observed under light microscopy. It has various shape and sizes. It may be regular or irregular in shape. On an average it can be measured less than one micron to well over fifty microns with some exceptions. Commonly these particles include but are not limited to dust & debris, paint, combustions, emission, ash, silica and others.

These particulates are significant from a health/allergy point of view especially in case of respiratory disorder.

Fibers Identified from Tape Prep Assays
Man-Made Fibers

Man-made fibers may come from natural raw materials like cellulose or from synthetic chemicals like rayon, nylon, etc. In indoor environments, some important sources of man made fiber include carpet. cellulose based building materials, clothing, paper and paper products, etc. Size of these fibers varies from a few microns to a few millimeters; however, an average size range may be 1 micron to over 500 microns.

Health implications of these particles are not well described. however some of the man-made fibers are important from an allergy point of view especially for dermal allergy.

Spores I Fungal Elements Identified from Tape Prep Assays
Curvularia Species

Curvularia species are found worldwide and are very common. The hyphae, conidiophores, and conidia are pigmented olivaceous-brown (dematiaceous). They can be isolated from the air, plants (especially grasses), sand dune soil, and soil. Rarely, they can be an opportunist human pathogen causing allergic reactions, eye (corneal) infections, mycetoma, and infections in immunocompromised patients.

Other Material Identified from Tape Prep Assays
"Talc-Like" Particles

These are thin disk-like particles of variable size range (10 to 50 micron), It may be organic or inorganic in nature. In indoor environment these particles mainly come from cornmeal, other grain flour, talcum powder etc. Some of these particles may adversely influence the health of dweller (example talcum powder).

Black Particles

These microscopic particles may originate from an organic source material. They greatly vary in their shape and sizes depending on their origin. However, an average size ranges between 1-micron to 5 micron with some exceptions. It may be regular or irregular in shape. In the indoor environment some important source/cause of these particles includes but are not limited to combustion, burning of oil & candles, chimney shoot, automobile exhaust, neoprene (rubber compound that applied to the inside surface of fiber glass duct liner), and other organic materials emitted by copier machines, printers, abraded paints etc. These particles may influence health and hygienic condition of dwellers.

Reddish-Brown Particles

These microscopic particles may originate from inorganic or organic source materials. In indoor environments these particles mainly come by rusting, coarse, weathering of materials etc. They may also be released into the environment due to deterioration of wood or wood products, art and sculpture work etc. These particles greatly vary in their shape and sizes. It can be measured from a few micron to over 100-microns. This particle may be the indicator of moisture problem in indoor environment.

The health implications of this material are not well established however; it may be significant from a health and hygiene point of view.

As seen from the reported results, an air handler without a filter would be expected to have significant increase in particulate.

This was not the case. The congruity of results indicates that the system of the present invention provides particulate filtration similar to filtration results when using an air filter.

In one embodiment, an additive is added to system 10. Additives include, but are not limited to materials such as, aromatic, antimicrobial, anti fungal, anti-mole, anti-spore, or combinations thereof.

One embodiment adds the additive to at least one water chamber. The additive can be a solid, semi solid or liquid.

One embodiment provides an additive as a solid in which the additive is released over an extended period of time being 1-90 days.

In one embodiment, addition of anti-mold materials is a step in a method to clean mold from duct work.

The method includes the steps of
providing a an article/system of the present invention;
adding a mold killing or remediation component to the water chamber of the article;
running the air conditioner such that the mold killing component is carried through the system, into the existing air handler;
dispersing the mold killing component through the air conditioning ductwork;

wherein the method is carried out for 1-90 days until mold is killed and no longer in the ductwork.

This method can be used to sterilize and deodorize air ducts. The method is not limited to distribution of a single additive and can be used with a plurality of additives.

The present invention has an additional feature in that there is no need to clean or change the water in any water chamber.

Particulate in the inlet air 70 is directed into water in a water chamber. Air pressure from the system circulates water in all water chambers such that particulate is not able to settle or accumulate. The particulate circulates in the water. As water levels rise above the aforementioned drainage heights, particulate is carried out of the article 10 and ultimately deposited outside article 10 though drain 48.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A system for filtering inlet air of an air conditioner air handler, the system comprising:
   an air inlet;
   a first air directing structure comprising an air constriction deflector configured to act in concert with the air inlet to direct air from the air inlet into a first internal cavity;
   a first water chamber containing condensate water, wherein the water chamber is positioned within the first internal cavity so that inlet air passing through the first air directing structure directs air into the condensate water contained in the first water chamber, and wherein the condensate water is introduced into the first water chamber from an air conditioner air handler through a structure that connects the air conditioner air handler to the system;
   a drain positioned to impart a maximum water level of water accumulated from the condensate water in the first water chamber, wherein arrangement of the structure for directing condensate water into the first water chamber and the drain provides continual introduction and circulation of the condensate water in the first water chamber; and
   a second air directing structure configured to direct air from the first internal cavity towards an outlet that is affixed to an inlet of the air conditioner air handler, wherein particulates in the ambient air are removed before the ambient air is directed to the outlet, and wherein the inlet air being directed into the water contained in the first water chamber results in removal of the particulates.

2. The system of claim 1, wherein the air inlet is configured to draw in ambient air through a negative pressure differential created by an inlet fan of the air conditioner air handler.

3. The system of claim 1, further comprising an air constricting structure incorporated within the first air directing structure.

4. The system of claim 1, further comprising a second water chamber positioned above the first water chamber into which condensate water is received from the structure and then flows into the first water chamber when a maximum water level is exceeded in the second water chamber.

5. The system of claim 4, where the second water chamber is positioned in an airflow stream between the first water chamber and the outlet.

6. A method of removing particulate from an air conditioner air handler inlet, the method comprising the steps of:
   (a) providing a system comprising:
      (i) an air inlet;
      (ii) a first air directing structure comprising an air constriction deflector configured to act in concert with the air inlet to direct air from the air inlet into a first internal cavity;
      (iii) a first water chamber containing condensate water, wherein the water chamber is positioned within the first internal cavity so that inlet air passing through the first air directing structure directs air into the condensate water contained in the first water chamber, and wherein the condensate water is introduced into the first water chamber from an air conditioner air handler through a pipe or tube that connects the air conditioner air handler to the system;
      (iv) a drain positioned to impart a maximum water level of water accumulated from the condensate water in the first water chamber, wherein arrangement of the structure for directing condensate water into the first water chamber and the drain provides continual introduction and circulation of the condensate water in the first water chamber; and
      (v) a second air directing structure configured to direct air from the first internal cavity towards an outlet that is affixed to an inlet of the air conditioner air handler;
   (b) arranging the system to connect the outlet to the inlet of the air conditioner air handler so that substantially all air exiting the system enters the air conditioner air handler;
   (c) activating the air conditioner air handler, wherein the activating creates negative pressure in the system and draws ambient air into the air inlet;
   (d) directing the ambient air through the first internal cavity and into condensate water in the first water chamber;
   (e) further directing the ambient air from the first internal cavity to the second air directing structure towards the outlet and into the inlet of the air conditioner air handler; and
   (f) removing particulates from the ambient air before the ambient air is directed to the outlet.

7. A system for filtering particulates from air flowing through an air handler of an air conditioner, the system comprising:
   a first cavity formed by a front frame and a lower vertical baffle plate;
   an air inlet for receiving ambient air into the first cavity;
   an air constriction area formed by the front frame, the lower vertical baffle plate, and an air constriction deflector attached to the lower vertical baffle plate, wherein the air constriction area connects to the first cavity so as to receive air flow from the first cavity;
   an inlet cavity formed between the lower vertical baffle plate and a lower water chamber, wherein the lower water chamber contains water, and wherein the inlet cavity connects to the air constriction area so as to receive air flow from the air constriction area;
   a first inner chamber formed between a first deflecting baffle and an upper water chamber, wherein the upper water chamber contains water, wherein the upper water chamber is constructed so that water exceeding a maximum upper water chamber level flows out of the upper water chamber and into the lower water chamber, and wherein the first inner chamber connects to the inlet cavity so as to receive air flow from the inlet cavity;
   a second inner chamber formed between the first deflecting baffle plate and a second deflecting baffle plate, wherein the second inner chamber connects to the first inner chamber so as to receive air flow from the first inner chamber;
a third inner chamber formed between the second deflecting baffle plate and an upper baffle plate, wherein the third inner chamber connects to the second inner chamber so as to receive air flow from the second inner chamber;
an upper chamber formed above the upper baffle plate and by an upper wall, wherein the upper chamber connects to the third inner chamber so to as receive air flow from the third inner chamber, and wherein the upper chamber; and
an outlet for receiving air flow from the upper chamber into an air conditioner air handler inlet of an air conditioner air handler to which the outlet is connected.

8. The system of claim 7, wherein the inlet cavity and lower water chamber are located below the first inner chamber and upper water cavity.

9. The system of claim 8, wherein the first inner chamber and upper water cavity are located below the second inner chamber.

10. The system of claim 9, wherein the second inner chamber is located below the third inner chamber.

11. The system of claim 10, wherein the upper chamber and outlet are located above the third inner chamber.

12. The system of claim 7, further comprising a pipe connected to the upper water chamber so that condensate water from the air conditioner air handler flows through the pipe into the upper water chamber to supply the water contained therein.

13. The system of claim 7, further comprising a waste water drain installed in the lower water chamber and comprising a height so that when a maximum lower water chamber level is exceeded, water flows into the waste water drain and then into a waste water drain pipe that is connected to the waste water drain.

14. The system of claim 7, wherein particulates are removed from the air before it reaches the air conditioner air handler when the air flowing through the inlet cavity and the first inner chamber contacts the water contained in the lower water chamber and the upper water chamber, wherein the air flowing through the system circulates the water in the lower water chamber and in the upper water chamber so that the particulates do not settle or accumulate in either chamber but are carried out of the system through a waste water drain pipe after a maximum lower water chamber level is exceeded.

15. The system of claim 7, further comprising an antimicrobial material, an antifungal material, or both materials installed in at least one of the lower water chamber and the upper water chamber.

16. The system of claim 7, wherein negative pressure is created at the outlet by an inlet fan of the air conditioner air handler to which the system is connected so as to draw air through the system from the inlet to the outlet.

17. The system of claim 13, further comprising a malfunction feature wherein when the maximum lower water chamber level is exceeded but the excess water fails to drain out of the lower water chamber through either the waste water drain or through the waste water drain pipe, air flow from the inlet cavity is blocked and the air conditioner air handler freezes and ceases to cool the air when the water rises to a level at or above a bottom portion of the lower vertical baffle plate.

18. A method for removing particulates from air entering an air conditioner air handler by contacting the air with water, the method comprising the steps of:
(a) creating negative pressure at an outlet of an air filtering system to draw ambient air into a first cavity of the air filtering system through an inlet, wherein the first cavity is formed by a front frame and a lower vertical baffle plate;
(b) drawing the air from the first cavity into an air constriction area formed by the front frame, the lower vertical baffle plate, and an air constriction deflector attached to the lower vertical baffle plate, wherein the air constriction area connects to the first cavity so as to receive air flow from the first cavity;
(c) drawing air from the air constriction area into an inlet cavity formed between the lower vertical baffle plate and a lower water chamber, wherein the lower water chamber contains water, and wherein the inlet cavity connects to the air constriction area so as to receive air flow from the air constriction area;
(d) contacting the air with the water in the lower water chamber as the air flows through the inlet cavity so as to remove particulates from the air;
(e) drawing air from the inlet cavity into a first inner chamber formed between a first deflecting baffle and an upper water chamber, wherein the upper water chamber contains water, wherein the upper water chamber is constructed so that water exceeding a maximum upper water chamber level flows out of the upper water chamber and into the lower water chamber, and wherein the first inner chamber connects to the inlet cavity so as to receive air flow from the inlet cavity;
(f) contacting the air with the water in the upper water chamber as the air flows through the first inner chamber so as to remove particulates from the air; and
(g) drawing air through the outlet into an air conditioner air handler inlet of an air conditioner air handler to which the outlet is connected.

19. The method of claim 18, further comprising at least one of the following steps after step (f) and before step (g):
(h) drawing air from the first inner chamber into a second inner chamber formed between the first deflecting baffle plate and a second deflecting baffle plate, wherein the second inner chamber connects to the first inner chamber so as to receive air flow from the first inner chamber;
(i) drawing air from the second inner chamber into a third inner chamber formed between the second deflecting baffle plate and an upper baffle plate, wherein the third inner chamber connects to the second inner chamber so as to receive air flow from the second inner chamber; and
(j) drawing air from the third inner chamber into an upper chamber formed above the upper baffle plate and by an upper wall, wherein the upper chamber connects to the third inner chamber so to as receive air flow from the third inner chamber, and wherein the upper chamber.

20. The method of claim 18, further comprising before step (a) the steps of:
(k) constructing the upper water chamber so that when water exceeds a maximum upper water chamber level, the water flows down into the lower water chamber;
(l) connecting a waste water drain to a waste water drain pipe that exits the lower water chamber so that if the water in the lower water chamber exceeds a maximum lower water chamber level, the water flows into the waste water drain and then into the waste water drain pipe and out of the lower water chamber; and
(m) constructing the inlet cavity so that if water in the lower water chamber rises above the maximum lower water chamber level but fails to drain out of the lower water chamber through either the waste water drain or through the waste water drain pipe, air flow from the inlet cavity is blocked and the air conditioner air handler freezes and ceases to cool the air when the water rises to a level at or above a bottom portion of the lower vertical baffle plate.

* * * * *